(12) United States Patent
Takehira et al.

(10) Patent No.: US 9,386,635 B2
(45) Date of Patent: Jul. 5, 2016

(54) INDUCTION HEATING COOKING DEVICE

(75) Inventors: Takashi Takehira, Hyogo (JP);
Fumitaka Ogasawara, Hyogo (JP);
Masashi Kinoshita, Hyogo (JP); Yuji Yamamoto, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 247 days.

(21) Appl. No.: 13/643,644

(22) PCT Filed: Jun. 10, 2011

(86) PCT No.: PCT/JP2011/003316
§ 371 (c)(1),
(2), (4) Date: Oct. 26, 2012

(87) PCT Pub. No.: WO2011/155224
PCT Pub. Date: Dec. 15, 2011

(65) Prior Publication Data
US 2013/0037536 A1 Feb. 14, 2013

(30) Foreign Application Priority Data
Jun. 10, 2010 (JP) ................................. 2010-132672

(51) Int. Cl.
*H05B 6/06* (2006.01)
*H05B 6/12* (2006.01)

(52) U.S. Cl.
CPC .............. *H05B 6/062* (2013.01); *H05B 6/1272* (2013.01); *Y02B 40/126* (2013.01)

(58) Field of Classification Search
CPC ................. H05B 6/1209; H05B 6/062; H05B 2206/022; H01L 23/345; G06F 3/0488; G06F 3/04883; G06F 3/044

USPC ........................... 219/622, 497, 209; 345/173
See application file for complete search history.

(56) References Cited

U.S. PATENT DOCUMENTS

| 6,118,105 A * | 9/2000 | Berkcan ............... H05B 1/0266 |
| | | 219/449.1 |
| 7,573,005 B2 * | 8/2009 | Clothier ........................ 219/497 |

(Continued)

FOREIGN PATENT DOCUMENTS

| CN | 101444138 A | 5/2009 |
| JP | 2008-159494 A | 7/2008 |

(Continued)

OTHER PUBLICATIONS

International Search Report for International Application No. PCT/JP2011/003316, dated Aug. 2, 2011, 1 page.

(Continued)

*Primary Examiner* — Dana Ross
*Assistant Examiner* — Kuangyue Chen
(74) *Attorney, Agent, or Firm* — Brinks Gilson & Lione (57) ABSTRACT

The disclosed induction heating cooking device includes a boiling-over detection portion which is adapted to reduce heating output from an inverter to a pre-set value if the amount of change of a capacitance detected by a capacitance detection portion from a reference value (Vo) is equal to or more than an output reduction threshold value ($\Delta V2$), and further is adapted to stop heating, if the amount of change is equal to or more than an output stop threshold value ($\Delta V3$). In this case, the output stop threshold value is provided for each of the plurality of the electrodes, which can absorb impedance variations in the plurality of the electrodes formed through pattern printing using conductive films, thereby uniformizing their sensitivity to boiling over in any directions.

10 Claims, 5 Drawing Sheets

(56) References Cited

U.S. PATENT DOCUMENTS

| | | | |
|---|---|---|---|
| 7,947,924 B2 * | 5/2011 | Niiyama | H05B 6/062 219/209 |
| 2005/0247696 A1 | 11/2005 | Clothier | |
| 2009/0303201 A1 * | 12/2009 | Isoda | H05B 6/062 345/173 |
| 2011/0309069 A1 * | 12/2011 | Fujinami | H05B 6/062 219/622 |

FOREIGN PATENT DOCUMENTS

| | | |
|---|---|---|
| JP | 2008159494 A * | 7/2008 |
| JP | 2010-97960 A | 4/2010 |
| WO | WO 2010/079583 A1 | 7/2010 |

OTHER PUBLICATIONS

International Preliminary Report on Patentability for International Application No. PCT/JP2011/003316, dated Jan. 15, 2013, 5 pages.

Office Action and Search Report, and partial translation thereof, in corresponding Chinese Application No. 201180020630.X, dated Jun. 10, 2014, 7 pages.

Extended European Search Report in corresponding European Application No. 11792183.3, dated Jul. 10, 2015, 5 pages.

* cited by examiner

INDUCTION HEATING COOKING DEVICE

This application is a 371 application of PCT/JP2011/003316 having an international filing date of Jun. 10, 2011, which claims priority to JP2010-132672 filed Jun. 10, 2010, the entire contents of which are incorporated herein by reference.

TECHNICAL FIELD

The present invention relates to induction heating cooking devices, and more particularly relates to induction heating cooking devices having boiling-over detection functions for detecting boiling over from heating containers such as pans, during heating cooking.

BACKGROUND ART

As described in Patent Document 1, conventional induction heating cooking devices have been provided with a plurality of electrodes around outer peripheries of heating coils and have been adapted to perform boiling-over detection based on the changes of the capacitances of these electrodes.

Figure 5:
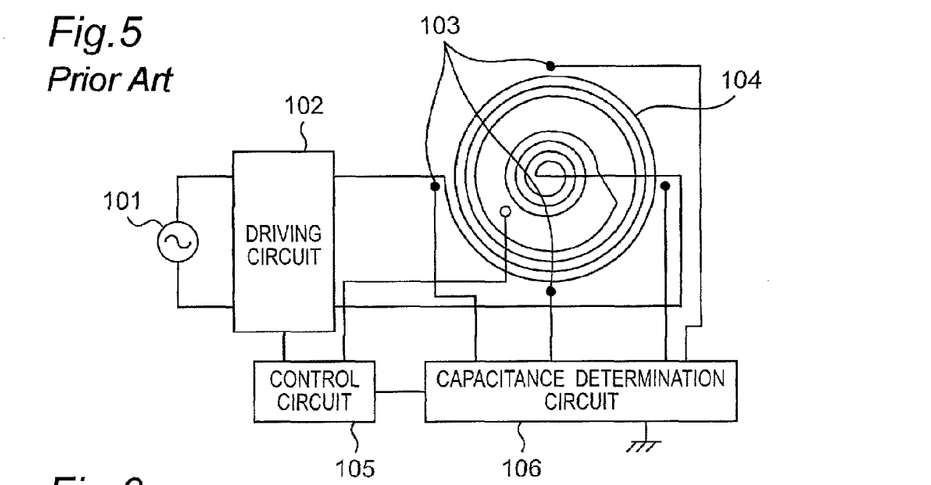
FIG. 5 is a block diagram illustrating the structure of a conventional induction heating cooking device.
Figure 6:
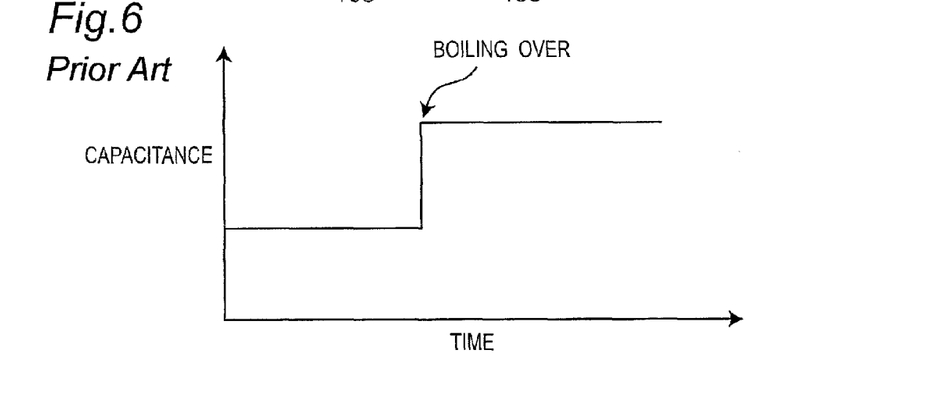
FIG. 6 is a graph illustrating the change of a capacitance in boiling-over detection in the conventional induction heating cooking device.

FIG. 5 is a view illustrating the structure of a conventional induction heating cooking device described in Patent Document 1. FIG. 6 is a graph illustrating a capacitance change in an electrode for performing boiling-over detection, in the induction heating cooking device described in Patent Document 1. As illustrated in FIG. 5, in the conventional induction heating cooking device, a plurality of electrodes 103 each having a small disk shape are placed and dispersed in a concentric shape around the outer periphery of a heating coil 104. The respective electrodes 103 which are placed and dispersed are connected to a capacitance determination circuit 106, for detecting the capacitances between the respective electrodes 103 and dielectric members around the electrodes, such as air or heating containers.

As described above, in the conventional induction heating cooking device, the plurality of the electrodes 103 are placed and dispersed around the outer periphery of the heating coil 104. Therefore, in the event of boiling over of liquid from the peripheral edge portion of a heating container such as a pan placed above the heating coil 104 with a top board (top plate) interposed, the liquid having boiled over exists on or around any of the electrodes 103. As a result, the liquid having boiled over changes the capacitance of any of the electrodes 103, thereby causing the boiling over to be detected.

In the state where no boiling over has occurred during heating of the heating container, air having a relative dielectric constant of "1" mainly exists between the electrodes 103 and the heating container, in addition to the top board. However, if boiling over occurs, water is interposed between the electrodes 103 and the heating container, which induces abrupt increases of the capacitances. Accordingly, by detecting the changes of the capacitances of the electrodes 103 as described above, it is possible to detect boiling over.

In the induction heating cooking device described in Patent Document 1, when an abrupt increase in the capacitances of the electrodes 103 is detected (see FIG. 6), a control circuit 105 determines that boiling over has occurred. At this time, the induction heating cooking device described in Patent Document 1 is adapted to stop the operation of a driving circuit 102 or to reduce the electric current flowing through the heating coil 104, wherein the driving circuit 102 is adapted to produce high-frequency electric power when electric power from an AC power supply 101 is inputted thereto.
Patent Document 1: JP 2008-159494 A

DISCLOSURE OF THE INVENTION

Problems to be Solved by the Invention

In the induction heating cooking device described in Patent Document 1, the plurality of the electrodes are formed through conductive pattern printing. This induces the problem that the difference of the impedances of the respective electrodes due to the routing of the electrodes largely affects the sensitivity of the electrodes, namely the amounts of the capacitance changes in the electrodes. For example, in cases where the capacitance determination circuit portion illustrated in FIG. 5 includes connection-point terminals, the electrodes (the electrodes in the rear side) which are diagonally faced to the capacitance determination circuit portion across the heating coil form longer electrodes having larger impedances. Electrodes having such larger impedances can be changed in capacitance by smaller amounts than those of electrodes having smaller impedances. Thus, if boiling over occurs such that its amount around the electrodes in the rear side is not larger than around the front electrodes, this boiling over cannot be easily detected. That is, the conventional induction heating cooking device requires a user to frequently perform maintenance due to occurrences of boiling over and cannot be said to have excellent usability.

Generally, an induction heating cooking device is provided with a top board, as a surface used for cooking, having a smooth surface with no concavity and convexity. Accordingly, contaminations induced by boiling over can be easily wiped away. However, if boiling over occurs and is left as it stands, this induces problems in terms of safety, in cases where the boiling over is larger in amount. Even in cases where the boiling over is smaller in amount, the boiled-over contents are dried on the top board to be adhered thereto, which induces the problem of difficulty in wiping them away. Accordingly, in the event of the occurrence of boiling over, it is important to immediately notify the user of the occurrence of boiling over and to stop or reduce the heating operation.

However, in conventional induction heating cooking devices, boiling over in larger amounts can occur, depending on the direction in which the boiling over occurs. Further, false detections have been induced at higher frequencies, only when a pan or a metal object is placed in certain orientations (directions) above the heating coil. Eventually, conventional induction heating cooking devices have induced heating reduction and heating stoppage, due to false operations. Further, the burdens for maintenance operations have not been necessarily small.

It is an object of the present invention to provide an induction heating cooking device capable of entirely uniformizing false-detection levels and amounts of boiling over from heating containers, which may occur during heating. Further, it is another object of the present invention to provide an induction heating cooking device capable of certainly detecting the occurrence of boiling over.

Means for Solving the Problems

In order to overcome the conventional problems, an induction heating cooking device according to the present invention includes: a top board on which a heating container is placed; a heating coil which is provided under the top board and is adapted to inductively heat the heating container; an inverter for supplying a high-frequency electric current to the heating coil; a plurality of electrodes provided on a back surface of the top board, around a periphery of the heating coil; a capacitance detection portion adapted to supply a high-frequency signal to the electrodes and to detect a capacitance in each of the electrode; a storage portion capable of storing the detected capacitance as a reference value; a control portion adapted to perform control such that a heating output from the inverter comes to have a first set value set at the start of induction heating; and a boiling-over detection portion adapted to stop a heating operation of the inverter or to reduce the heating output from the inverter to a third set value smaller than the first set value, upon detecting a boiling-over state, at least when the capacitance detected by the capacitance detection portion has been changed from the reference value by an amount equal to or more than a third amount of change, wherein each of the electrodes is provided in a linear shape, along the heating coil around an outer periphery of the heating coil, and, in the boiling-over detection portion, the third amount of change is set differently for each of the plurality of the electrodes.

Thus, it is possible to make uniform the boiling-over sensitivity variation due to the different impedances of the plurality of the electrodes, which can make uniform the target performance of the respective electrodes regarding amounts of boiling over and false-detection levels.

Effect of the Invention

With the induction heating cooking device according to the present invention, it is possible to make uniform boiling-over sensitivity variations caused by the variation of the impedances of the electrodes due to the routing of the electrodes, through adjustments of the settings of the output stopping threshold values, which enables setting of the boiling-over sensitivity in conformance with target performance, regardless of the direction in which spilling over occurs. Further, the induction heating cooking device according to the present invention is capable of preventing heating stoppage due to droplets and false detections due to electrodes with lower impedances (namely, with higher sensitivity), and also is capable of reducing amounts of boiling over around the electrodes with higher impedances. Further, the induction heating cooking device according to the present invention is capable of certainly detecting the occurrence of boiling over. Thus, with the present invention, it is possible to provide an induction heating cooking device with excellent reliability and safety.

DETAILED DESCRIPTION OF THE PREFERRED EMBODIMENTS

An induction heating cooking device as a first invention according to the present application includes: a top board on which a heating container is placed; a heating coil which is provided under the top board and is adapted to inductively heat the heating container; an inverter for supplying a high-frequency electric current to the heating coil; a plurality of electrodes provided on a back surface of the top board, around a periphery of the heating coil; a capacitance detection portion adapted to supply a high-frequency signal to the electrodes and to detect a capacitance in each electrode; a storage portion capable of storing the detected capacitance as a reference value; a control portion adapted to perform control such that a heating output from the inverter comes to have a first set value (3 kW or less, for example) set at the start of induction heating; and a boiling-over detection portion adapted to stop a heating operation of the inverter or to reduce the heating output from the inverter to a third set value (0 W, for example) smaller than the first set value, upon detecting a boiling-over state, at least when the capacitance detected by the capacitance detection portion has been changed from the reference value by an amount equal to or more than a third amount of change. Each of the electrodes are provided in a linear shape, along the heating coil around an outer periphery of the heating coil, and in the boiling-over detection portion, the third amount of change is set differently for each of the plurality of the electrodes. The structure of the induction heating cooking device as described above can make uniform the boiling-over sensitivity variation due to the different impedances of the plurality of the electrodes, and the target performance of the respective electrodes regarding amounts of boiling over and false-detection levels can thus be made uniform.

In an induction heating cooking device as a second invention according to the present application, the boiling-over detection portion is adapted (1) to execute reference-value updating processing for storing a newest capacitance as a reference value in the storing portion, when the capacitance detected by the capacitance detection portion has been changed from the reference value by an amount less than a first amount of change (for example, 3 digits=0.0586 V), and (2) to stop the reference-value updating processing, when the capacitance detected by the capacitance detection portion has been changed from the reference value by an amount equal to or more than the first amount of change. The structure of the induction heating cooking device as described above makes it possible to determine the amount of change in a newest state.

In an induction heating cooking device as a third invention according to the present application, the boiling-over detection portion is adapted (3) to reduce the heating output from the inverter to a second set value (0.3 kW, for example) smaller than the first set value, when the capacitance detected by the capacitance detection portion has been changed from the reference value by an amount which is equal to or more than a second amount of change (for example, 14 digits=0.273 V) larger than the first amount of change. The structure of the induction heating cooking device as described above makes it possible to temporarily reduce the output for suppressing the momentum of boiling over and to determine more specifically whether or not boiling over has occurred in this state.

An induction heating cooking device as a fourth invention according to the present application further includes a manipulation portion provided on the top board. For any of the electrodes near the manipulation portion, the third amount of change is set to be larger than those for the other electrodes. The structure of the induction heating cooking device as described above makes it possible to prevent intrusions of liquid having boiled over onto the manipulation portion.

In an induction heating cooking device as a fifth invention according to the present invention, the boiling-over detection portion is adapted to change the third amount of change such that the third amount of change comes to be larger with increasing set output of the heating coil. Thus, when the heating output is made higher, it is possible to degrade the boiling-over detection sensitivity for inhibiting the occurrence of inconvenient false detection.

Hereinafter, with reference to the accompanying drawings, there will be described a concrete embodiment of an induction heating cooking device according to the present invention. It is to be noted that the present invention is not limited to the concrete structure which will be described in the following embodiment and is intended to include structures based on technical concepts equivalent to the technical concepts which will be described in the following embodiment and based on technical common senses in the present technical field.

1. First Embodiment 1.1. The Structure of Induction Heating Cooking Device

Figure 1:
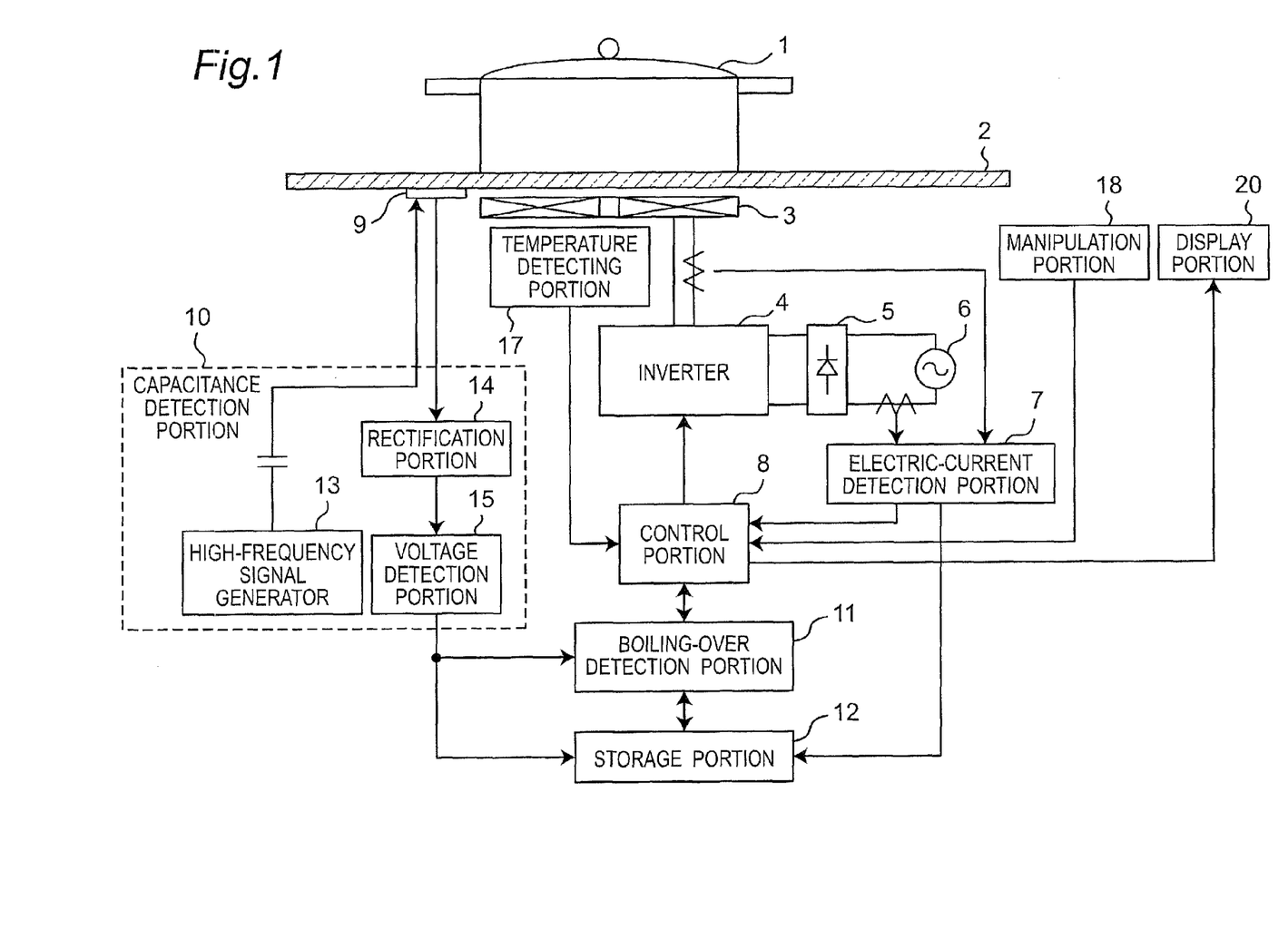
FIG. 1 is a block diagram illustrating the structure of an induction heating cooking device according to a first embodiment of the present invention.

FIG. 1 is a block diagram illustrating the structure of an induction heating cooking device according to a first embodiment of the present invention. The induction heating cooking device according to the first embodiment illustrated in FIG. 1 is structured to include a top board (top plate) 2 on which a heating container 1 (for example, a pan) is placed, heating coils 3 for inductively heating the heating container 1, an inverter 4 for supplying a high-frequency electric current to the heating coils 3, an AC power supply 6 for supplying electric power to the inverter 4 through a rectifier 5, an electric-current detecting portion 7 for detecting an input electric current supplied to the inverter 4 from the AC power supply 6 through the rectifier 5, and an output electric current supplied to the heating coils 3 from the inverter 4, a control portion 8 which drives and controls the inverter 4 based on input/output electric current detection signals from the electric-current detecting portion 7, a plurality of electrodes 9 formed through pattern printing on a back surface of the top board 2, a capacitance detecting portion 10 for detecting the capacitances of each of the electrodes 9, a storage portion 12 for storing capacitance detection signals resulted from detection by the capacitance detecting portion 10 and input/output electric current detection signals resulted from detection by the electric-current detecting portion 7, and a boiling-over detecting portion 11 for detecting that the heating container 1 is being in a boiling-over state, based on capacitance detection signals, input/output electric current detection signals and the like. Further, in this case, the term "the back surface of the top board 2" refers to the surface of the top board 2 opposite from the front surface, assuming that its surface on which the heating container 1 is placed is the front surface, in FIG. 1.

It is to be noted that the present embodiment will be mainly described with respect to structures and functions for detecting that the heating container 1 is being in boiling-over states. Namely, in the present embodiment, there will not be described functions and structures for detecting other states, such as functions for detecting other states than boiling-over states, for example, for detecting deviations, floating, scorching of the heating container 1 and for detecting small-object loads being placed on the top board 2. In the block diagram in FIG. 1, there are not illustrated other structures than the structures for detecting boiling-over states.

Figure 2:
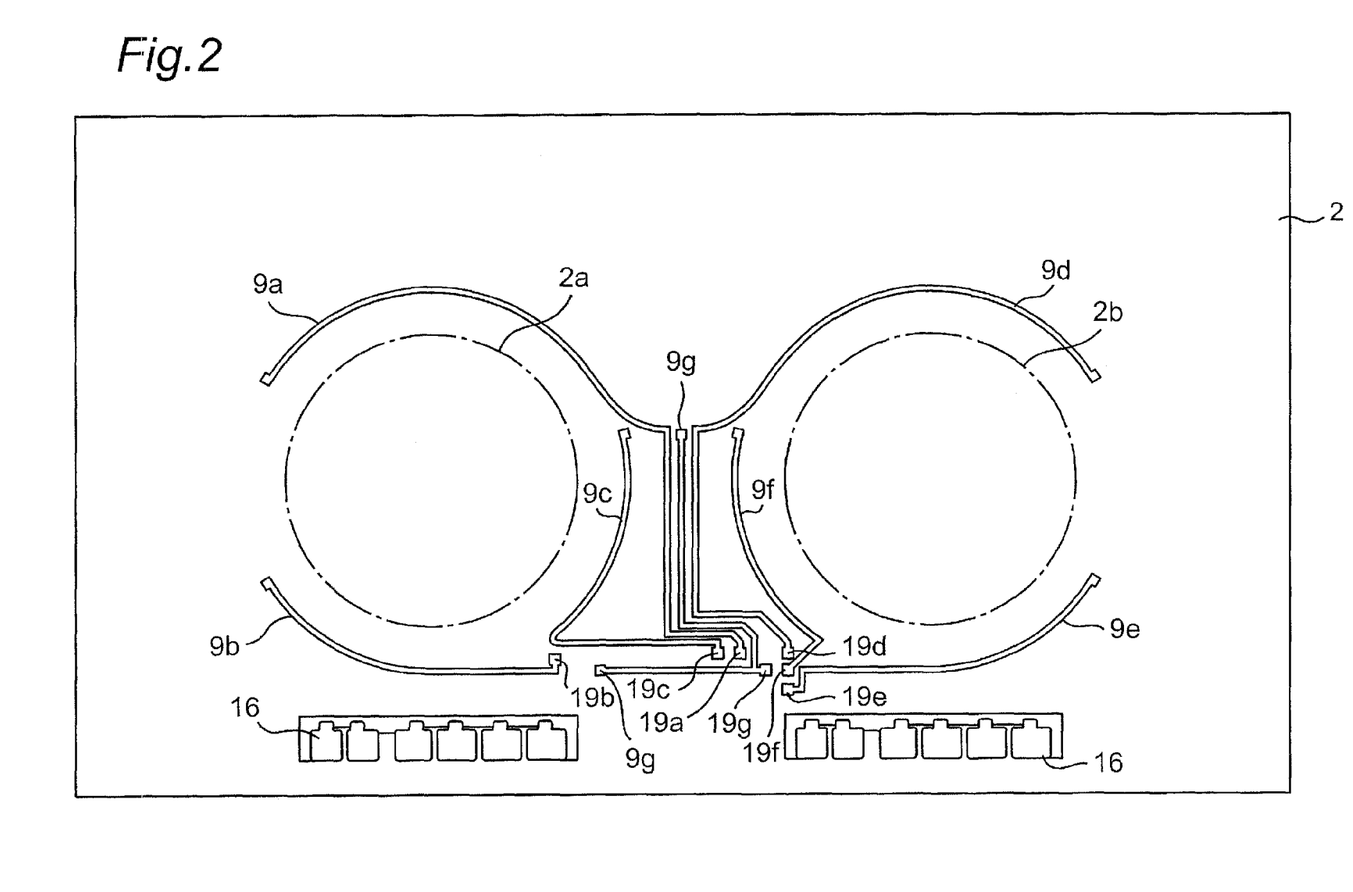
FIG. 2 is a plan view illustrating various types of electrodes and the like formed on a top board in the induction heating cooking device according to the first embodiment.

FIG. 2 is a plan view of the top board 2 in the induction heating cooking device according to the first embodiment, which is provided with various types of electrodes formed through pattern printing using conductive films. The various types of electrodes formed through pattern printing are formed on the back surface of the top board 2, and therefore, the plan view of FIG. 2 also illustrates the back surface of the top board 2.

The top board 2 illustrated in FIG. 2 is made of a heat-resistant glass, such as a crystallized glass. On the top board 2, there are drawn two circle patterns 2a and 2b indicating heating positions at which the heating container (such as a pan) 1, as an object to be heated, should be placed. These circle patterns 2a and 2b indicate positions which align with the heating coils 3 having a maximum output of 3 kW, for example. Further, the induction heating cooking device according to the present embodiment illustrated in FIG. 2 includes the two heating coils 3, but the number of the heating coils 3 is not limited to two, and the cooking device can include any number of heating coils 3, such as one, three or four heating coils. Note that the circle patterns and the electrodes are formed according to the number of these heating coils 3.

As illustrated in FIG. 2, in the induction heating cooking device according to the present embodiment, the top board 2 is provided with a plurality of manipulation electrodes 16 as manipulation switches which enable a user to make settings for operations of the induction heating cooking device. The manipulation electrodes 16 are provided at positions which are within an area closer to the user than the circle patterns 2a and 2b on the top board 2. In the following description, the user side of the top board 2 will be referred to as a front side, while the opposite side will be referred to as a rear side. Further, regarding the positions in the drawing illustrated in FIG. 2, for example, the left and right parts of the top board 2 will be referred to as a left side of the top board 2 and a right side of the top board 2, respectively, in order to identify the positions on the top board 2.

Around the outer peripheral portions of the circle patterns 2a and 2b, there are formed the plurality of electrodes 9 (boiling-over detection electrodes 9a to 9g). These electrodes 9 serve as state-detection electrodes for detecting boiling-over states and the like.

Around the outer peripheral portion of the circle pattern 2a in the left side on the top board 2 illustrated in FIG. 2, there are formed a left rear electrode 9a having an arc shape along an annular shape of the circle pattern 2a in the left and rear side, a left front electrode 9b having an arc shape along an annular shape of the circle pattern 2a in the left and front side, and a left center electrode 9c having an arc shape along an annular shape of the circle pattern 2a in the center side. The left rear electrode 9a, the left front electrode 9b and the left center electrode 9c are structured to surround the outer periphery of the circle pattern 2a in the left side. Further, the left rear electrode 9a, the left front electrode 9b and the left center electrode 9c are provided with respective connection terminals 19a, 19b and 19c, at one end portions of these respective electrodes. These connection terminals 19a, 19b and 19c perform the functions of detection terminals for detecting boiling-over states.

Similarly, around the outer peripheral portion of the circle pattern 2b in the right side on the top board 2 illustrated in FIG. 2, there are formed a right rear electrode 9d having an arc shape along an annular shape of the circle pattern 2b in the right and rear side, a right front electrode 9e having an arc shape along an annular shape of the circle pattern 2b in the right and front side, and a right center electrode 9f having an arc shape along an annular shape of the circle pattern 2b in the center side. The right rear electrode 9d, the right front electrode 9e and the right center electrode 9f are structured to surround the outer periphery of the circle pattern 2b in the right side. Further, the right rear electrode 9d, the right front electrode 9e and the right center electrode 9f are provided with respective connection terminals 19d, 19e and 19f, at one end portions of these respective electrodes. These connection terminals 19d, 19e and 19f have the functions of detection terminals for detecting boiling-over states.

At the center of the top board 2, between the left center electrode 9c and the right center electrode 9f, there is provided a protective electrode 9g. Further, the area provided with the protective electrode 9g is also an area between the continuous wiring pattern which forms the left rear electrode 9a and the connection terminal 19a and the continuous wiring pattern which forms the right rear electrode 9d and the connection terminal 19d. Further, the protective electrode 9g is also placed in an area parallel with the manipulation electrodes 16, in the front side of the center portion of the top board 2. The protective electrode 9g is also provided with a connection terminal 19g at an end portion thereof. The connection terminal 19g also has the functions of a detection terminal for detecting boiling-over states, similarly to in the other electrodes.

Returning to FIG. 1, the induction heating cooking device according to the first embodiment illustrated in FIG. 1 is further provided with a temperature detecting portion 17 for detecting the temperature of the heating container 1, and a manipulation portion 18 which enables the user to input settings of heating conditions and the like for the induction heating cooking device. Temperature signals indicative of the temperature of the heating container 1, which are outputted from the temperature detecting portion 17, and setting signals indicative of settings inputted to the manipulation portion 18 are inputted to the control portion 8. The control portion 8 drives and controls the inverter 4 based on these inputs. Further, the induction heating cooking device according to the present embodiment is provided with a display portion 20. The display portion 20 is structured to display heating conditions having been set by the user, operating states of the induction heating cooking device, and the like.

Further, as illustrated in FIG. 1, the capacitance detecting portion 10 includes a high-frequency signal generating portion 13 for supplying high-frequency signals to the respective electrodes 9, a rectification portion 14 for rectifying high-frequency electric currents from the respective electrodes 9, and a voltage detecting portion 15 for detecting the DC voltages having been rectified by the rectification portion 14. The respective connection terminals (19a to 19g) in the electrodes 9 (9a to 9g) are connected to the high-frequency signal generating portion 13 for supplying, to the respective electrodes 9 (9a to 9g), the high-frequency signal from the high-frequency signal generator 13 in the capacitance detecting portion 10 and are connected to the rectification portion 14 for detecting the capacitances of the respective electrodes 9 (9a to 9g).

1.2. Operations of the Induction Heating Cooking Device.

In the induction heating cooking device having the structure according to the first embodiment as described, the pan or the like as the heating container 1 is placed at the position indicated by the circle pattern 2a or 2b, then, the user inputs settings of heating conditions and the like to the manipulation portion 18, and an induction heating operation is started. In a heating initial stage after the start of the induction heating operation, no boiling over immediately occurs, and air having a relative dielectric constant of "1" mainly exists between the electrodes 9 and the heating container 1. Thereafter, the induction heating operation is continued, which brings the content within the heating container 1 being heated into a boiling state, thereby realizing a state where boiling over may occur. Further, once boiling over has occurred, a portion of the content containing a larger amount of water with a relative dielectric constant of about "80" exists around the electrodes 9. This results in an abrupt increase of the capacitances in the electrodes 9. If such a boiling-over state continues, this keeps the capacitances being increased.

As described above, until the content in the heating container 1 reaches a temperature which can induce boiling during the heating operation, there is no need for detection of boiling-over states. However, if the content reaches the temperature which can induce boiling, after the elapse of a certain time period, this may induce boiling over. Accordingly, it is necessary to continuously monitor boiling-over states, after the elapse of a certain time period. Accordingly, in the induction heating cooking device according to the present embodiment, a minimum certain time period taken for the content to reach the temperature which can induce boiling after the start of heating is set to 5 seconds, for example, and boiling-over detection operations are not performed within the 5 seconds. Further, if the temperature detection portion 17 detects that the temperature of the heating container 1 and the like has reached the temperature which may induce boiling within 5 seconds after the start of heating, the control portion 8 determines that an abnormality has occurred, and thus stops the heating operation.

In the induction heating cooking device according to the present embodiment, the boiling-over detecting portion 11 detects boiling-over states, based on capacitance detection signals indicative of the capacitances of the respective electrodes 9 from the capacitance detecting portion 10, and based on input/output electric current signals from the electric-current detecting portion 7.

Figure 3:
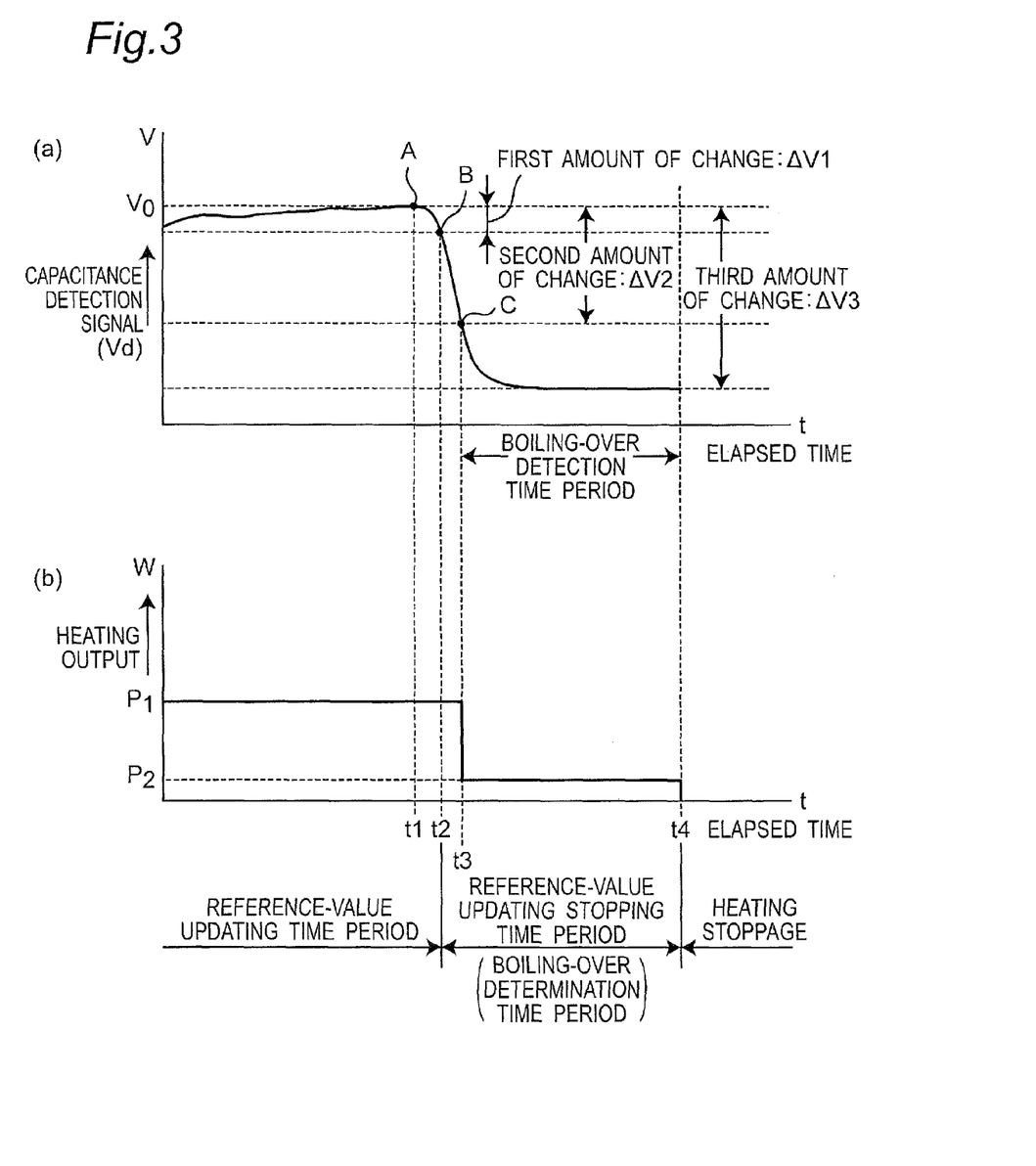
FIG. 3 illustrates an example of the change of a capacitance detection signal resulted from detection in the induction heating cooking device according to the first embodiment, and the change of a heating output from an inverter.

FIG. 3 illustrates an example of the change of a capacitance detection signal resulted from detection in the induction heating cooking device according to the first embodiment ((a) of FIG. 3), and the change of the heating output from the inverter 4 ((b) of FIG. 3). (a) of FIG. 3 is a waveform diagram illustrating an example of a capacitance detection signal (Vd)

which is inputted to the boiling-over detecting portion 11 from the capacitance detecting portion 10. Referring to (a) of FIG. 3, the vertical axis represents the capacitance detection signal (the voltage signal) outputted from the voltage detecting portion 15, while the horizontal axis represents the elapsed time. (b) of FIG. 3 is a view illustrating the change of the heating output (W) from the inverter 4, when the capacitance detection signal (Vd) illustrated in (a) of FIG. 3 is detected.

(a) of FIG. 3 illustrates the capacitance detection signal (Vd), in the case where the capacitance detection signal (Vd) as the voltage signal outputted from the voltage detecting portion 15 has abruptly decreased, due to an abrupt increase of the capacitance of any of the electrodes 9 due to the occurrence of boiling over from the heating container 1.

1.2.1. Boiling-Over Detection Operations.

Next, boiling-over detection operations in the state illustrated in (a) of FIG. 3 will be described. At first, at the beginning of heating of the heating container 1, namely in an initial stage of an induction heating operation (not illustrated in (a) of FIG. 3), the content in the heating container 1 has not reached the boiling temperature, and therefore no boiling over has occurred. Accordingly, no abrupt change occurs in the capacitance detection voltages detected by the voltage detecting portion 15 in the capacitance detecting portion 10. As described above, the induction heating cooking device according to the present embodiment is structured such that the cooking device does not perform boiling-over detection operations within a certain time period (for example, 5 seconds) after the start of induction heating operations. Actually, the cooking device executes processing for invalidating detection data (amounts of changes: $\Delta V$) resulted from calculations through boiling-over detection operations, which will be described later.

After the elapse of a certain time period (for example, 5 seconds) since the start of the induction heating operation, a boiling-over detection operation is started. The detection signals inputted from the respective electrodes 9 are inputted to the voltage detecting portion 15, after being rectified by the rectification portion 14. The capacitance detection signals (the voltage signals: Vd) resulted from detection by the voltage detecting portion 15 are continuously varied with the elapse of time. Therefore, during induction heating operations in the induction heating cooking device according to the present embodiment, the voltage detecting portion 15 continuously outputs the capacitance detection signals (Vd) from the respective electrodes 9 to the boiling-over detecting portion 11.

The boiling-over detecting portion 11 detects, at certain time intervals, the capacitance detection signal (Vd) indicative of the capacitance of each electrode 9 which has been inputted from the voltage detecting portion 15 in the capacitance detecting portion 10. Out of the voltage signals (the voltage values) resulted from detection at intervals of 20 ms (milliseconds), for example, the boiling-over detecting portion 11 calculates an average value of voltage signals (voltage values) resulted from each predetermined number of detections (for example, each eight detections). Further, the boiling-over detecting portion 11 defines the calculated average value as the capacitance signal (Vc) during this detection time period (a first predetermined time period: 1 second, for example). As will be described in detail later, the capacitance signals (Vc) resulted from such calculations are subjected to operational processing in the boiling-over detecting portion 11, in order to determine the presence or absence of boiling-over states.

Further, the graph illustrated in (a) of FIG. 3 represents a capacitance detection signal (Vd) outputted from the voltage detecting portion 15. The capacitance detection signal (Vd) is a signal which varies substantially similarly to the capacitance signal (Vc) used in the boiling-over detecting portion 11. In the following description, the change of the capacitance signal (Vc) will be described, with reference to the graph illustrated in (a) of FIG. 3.

1.2.2. [Boiling-Over Detection Operations in Cases where the Amount of Change of Capacitance Signal (Vc) is Less than a First Amount of Change ($\Delta V1$)]

The boiling-over detecting portion 11 stores (registers), in the storage portion 12, a capacitance signal (Vc(1)) which has been first detected through a boiling-over detection operation, as a reference value (Vo). Note that a preset value may be employed as the initial reference value (Vo). Further, a capacitance signal (Vc(2)) detected at second is compared with the registered reference value (Vo), and the amount of change therefrom ($\Delta V(2)$) is calculated. If the calculated amount of change ($\Delta V(2)$) is less than the preset first amount of change ($\Delta V1$), the capacitance signal (Vc(2)) at this time is registered as a reference value (Vo) in the storage portion 12. As described above, the capacitance signal (Vc(n)) is compared with the capacitance signal (Vc(n−1)) detected at the previous time as the reference value (the voltage signal), further the amount of change therefrom ($\Delta V$) is calculated, and the calculated amount of change ($\Delta V$) is compared with the first amount of change as a threshold value. Here, "Vc(n)" represents the capacitance signal detected at the present time point.

Accordingly, if the capacitance signal (Vc(n)) at the present time point has been changed by an amount ($\Delta V(n)$) less than the first amount of change ($\Delta V1$), the capacitance signal (Vc(n)) at this time is registered as a reference value (Vo) in the storage portion 12, and subsequently, will be compared with a capacitance signal (Vc(n+1)) which will be detected next time. As described above, during the time period within which the capacitance signal (Vc) gradually changes, newest reference values (Vo) are successively and continuously stored (registered) in the storage portion 12. Through boiling-over detection operations, the reference-value updating operations as described are successively performed, but if the amount of change ($\Delta V(n)$) comes to be equal to or more than the first amount of change, the reference-value updating operations are stopped, as will be described later. In the induction heating cooking device according to the present embodiment, the first amount of change ($\Delta V1$) which serves as a threshold value for determining whether or not to register a reference value (Vo) as an update, namely the reference-value updating stopping threshold value, is set to "3 digits".

It is to be noted that, in this case, "digits" represent a 8-bit (256-digit) resolution for 5V(volts). Accordingly, 1 digit corresponds to 0.0195 V (3 digits corresponds to 0.0586 V).

As described above, in normal states of induction heating operations, namely in states where the capacitances of the electrodes 9 are not abruptly changed, the amount of change calculated through the comparison between the capacitance signal (Vc(n)) at the present time point and the capacitance signal (Vc(n−1)) detected at the previous time as the reference value (Vo), is equal to or less than the first amount of change ($\Delta V1$: 3 digits, for example). Further, the capacitance signal (Vc(n)) detected at this time is registered (stored) as a new reference value (Vo) in the storage portion 12. As described above, in the induction heating cooking device according to the present embodiment, in normal states of induction heating operations, the detected capacitance signal (Vc) is compared with the newest reference value (Vo), at intervals of a detection time period (1 second, for example).

1.2.3. [Boiling-Over Detection Operations in Cases where the Amount of Change of Capacitance Signal (Vc) has Exceeded the First Amount of Change ($\Delta V1$)]

Next, there will be described operations in cases where the capacitance signal (Vc(n)) has been changed from the reference value (Vo) by an amount equal to or more than the first amount of change (the reference-value updating stopping threshold value: $\Delta V1$), in the boiling-over detecting portion 11.

Referring to the graph of (a) of FIG. 3, at the time the difference (the amount of change) between the capacitance detection signal (Vd), namely the capacitance signal (Vc), and the reference value has exceeded the first amount of change ($\Delta V1$) (as represented by a point B), the induction heating cooking device according to the present embodiment enters a reference-value updating stopping time period and executes reference-value updating stopping processing for stopping the reference-value updating processing. Namely, since the detected capacitance signal (Vc(n)) has been changed from the previous capacitance signal (Vc(n−1)) as the reference value by an amount equal to or more than the first amount of change ($\Delta V1$), the previous capacitance signal (Vc(n−1)) is kept registered as the reference value (Vo). In the example illustrated in (a) of FIG. 3, the reference value (Vo) at the point A is fixed as the reference value. Therefore, the next capacitance signal (Vc(n+1)) is compared with the previous capacitance signal (Vc(n−1)) having been registered as the reference value (Vo), and the amount of change ($\Delta V(n+1)$) therefrom is calculated. As described above, during the reference-value updating stopping time period, the reference value (Vo) is fixed, and the amount of change from the fixed reference value (Vo) is calculated.

Further, even within the reference-value updating stopping time period (the boiling-over determination time period illustrated in FIG. 3) after the amount of change of the capacitance signal (Vc) has exceeded the first amount of change ($\Delta V1$), if the next-detected capacitance signal (Vc(n+1)) has been changed from the previously-registered reference value (Vo) by an amount equal to or less than the first amount of change ($\Delta V1$), again, the reference-value updating stopping time period is cancelled, and the capacitance signal (Vc(n+1)) detected at this time is newly registered as a reference value. Accordingly, if the amount of change of the capacitance signal (Vc) exceeds the first amount of change ($\Delta V1$), this causes a reference-value updating stopping state, but if the capacitance signal (Vc) newly detected after the elapse of a certain detection time period (1 second, for example) has been changed by an amount equal to or less than the first amount of change ($\Delta V1$), the boiling-over detecting portion 11 determines that the induction heating operation is in a normal state. Thus, the boiling-over detection portion 11 returns to a reference-value updating time period, from the reference-value updating stopping time period, and performs reference-value updating processing.

1.2.4. [Boiling-Over Detection Operations in Cases where the Amount of Change of Capacitance Signal (Vc) has Exceeded a Second Amount of Change ($\Delta V2$)]

In the reference-value updating stopping state (within the reference-value updating stopping time period), if the capacitance signal (Vc(n)) at the present time point has been changed from the previously-registered reference value (Vo) by an amount exceeding the first amount of change ($\Delta V1$), and further, equal to or more than a second amount of change (an output reduction threshold value: $\Delta V2$), the induction heating cooking device according to the present embodiment enters a boiling-over detection time period (see (a) of FIG. 3). In the induction heating cooking device according to the present embodiment, the output reduction threshold value as the second amount of change ($\Delta V2$), which serves as a threshold value for determining whether or not to enter a boiling-over detection time period, is set to "14 digits". In this case, "14 digits" indicates 0.273 V. In the induction heating cooking device according to the present embodiment, for example, the boiling-over detection time period is set to 3.0 seconds and thus is set such that a determination of boiling over is confirmed after the elapse of 3.0 seconds since when the capacitance signal (Vc(n)) detected at the present time point had been changed from the reference value (Vo) by an amount exceeding the second amount of change (the output reduction threshold value: $\Delta V2$).

The induction heating cooking device according to the present embodiment reduces (downs the wattage of) the heating output from the inverter 4, from a first set value (P1: 3 kw, for example) registered at the time of setting of conditions of induction heating operations, to a second set value (P2: 300 W, for example), during the boiling-over detection time period after the difference (the amount of change) between the detected capacitance signal (Vc(n)) and the reference value has come to be equal to or more than the second amount of change (the output reduction threshold value: $\Delta V2$).

1.2.5. [Boiling-Over Detection Operations in Cases where the Amount of Change of Capacitance Signal (Vc) has Exceeded a Third Amount of Change ($\Delta V3$)]

In the reference-value updating stopping state (within the reference-value updating stopping time period), if the capacitance signal (Vc(n)) at the present time point has been changed from the previously-registered reference value (Vo) by an amount exceeding the first amount of change ($\Delta V1$) and the second amount of change (the output reduction threshold value: $\Delta V2$) and further equal to or more than a third amount of change (an output stop threshold value: $\Delta V3$), boiling-over detection is confirmed at the time the boiling-over detection time period ends.

In the induction heating cooking device according to the present embodiment, the output stop threshold value as the third amount of change ($\Delta V3$) which serves as a threshold value for determining whether or not to confirm boiling-over detection is set for each of the plurality of electrodes. For example, the output stop threshold value is set to "50 digits" for the electrodes 9c and 9f in the left and right sides, "55 digits" for the electrodes 9b and 9e in the front side, and "20 digits" for the electrodes 9a and 9d in the rear side. The output stop threshold value is set, based on the impedances of the respective electrodes formed through the pattern printing using the conductive films. Namely, the output stop threshold value (the third amount of change) is set such that the third amount of change is reached when there is boiling over in an amount equal to or more than a certain amount, around each of the electrodes.

Figure 3A:
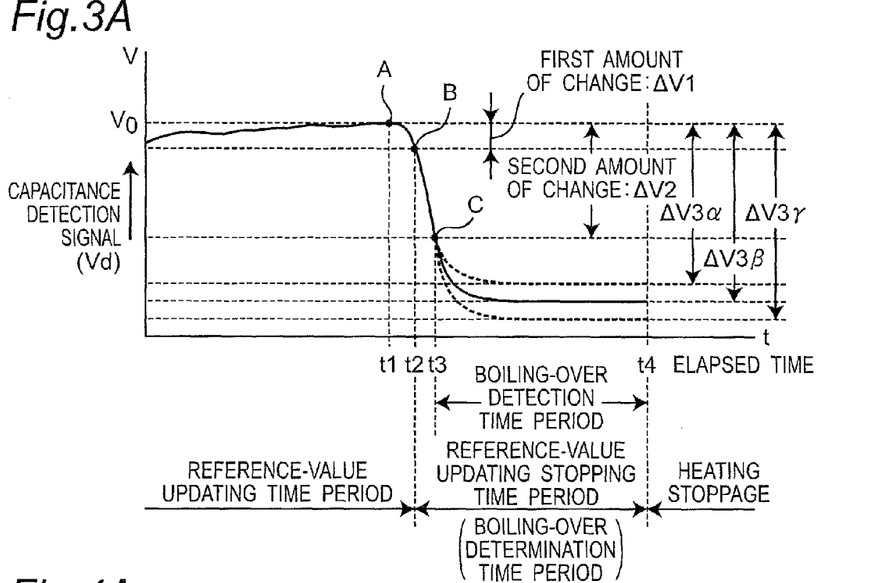
FIG. 3A is a view of the changes of capacitance signals, indicating states where boiling-over detection is confirmed, with respect to a plurality of electrodes (three electrodes) for which the third amount of change is set differently, in the induction heating cooking device according to the first embodiment.

FIG. 3A is a view of the changes of capacitance signals, indicating states where boiling-over detection is confirmed, with respect to a plurality of electrodes (three electrodes) having different impedances for which different third amounts of changes are set. In the example illustrated in FIG. 3A, the respective third amounts of changes $\Delta V3\alpha$, $\Delta V3\beta$ and $\Delta V3\gamma$ are set for the three electrodes.

For each of the electrodes, within a boiling-over detection time period (3 seconds, for example) during a reference-value updating stopping time period, a determination is made as to whether or not the amount of change of the capacitance signal is equal to or more than the output stop threshold value, and if the amount of change of the capacitance signal is equal to or more than the output stop threshold value, boiling-over detection is confirmed at the time the boiling-over detection time period has elapsed.

In the event that boiling-over detection is confirmed since the capacitance signal (Vc(n)) at the present time point has been changed from the previously-registered reference value (Vo) by an amount equal to or more than the third amount of change (the output stop threshold value: $\Delta V3$), the induction heating cooking device according to the present embodiment causes a transition of the heating output from the inverter 4 to heating stoppage, from the first set value (P1: 3 kw, for example) or the second set value (P2: 300 W, for example).

In the induction heating cooking device according to the present embodiment, the third amounts of changes (the output stop threshold values: $\Delta V3$) set for the respective electrodes can be varied, according to the set outputs of the heating coils. For example, in cases of using aluminum pans which are less prone to induce boiling over, and in cases of making the heating output higher, it is possible to set the third amounts of changes as the output stop threshold values to be larger, in order to degrade the accuracy of boiling-over detection for inhibiting false detections.

1.2.6 Regarding Other Detection Operations

In the induction heating cooking device according to the present embodiment, within a boiling-over detection time period, transitions (temporal changes) of the capacitance signals (Vc) in a reference-value updating stopping state are detected. At this time, the induction heating cooking device makes determinations as to whether boiling-over states are severe or slight or determinations of other states than boiling-over states, based on the gradients of these transitions. In this case, such other states than boiling-over states mean, for example, states where the heating container 1 is deviated, states where the heating container 1 is floating, states where small-object loads are placed on the top board, and the like.

Further, in order to make determinations as to whether boiling-over states are severe or slight and determinations of other states than boiling-over states, during the boiling-over detection time period, the induction heating cooking device makes determinations as to whether or not parameter changes in outputs, such as the output electric current and the output voltage from the inverter 4, are equal to or less than predetermined values.

Within the boiling-over detection time period, if the detected capacitance signal (Vc) exceeds the second amount of change ($\Delta V2$), also, the gradient of the transition of the capacitance signal (Vc) is equal to or more than a predetermined gradient value and, further, the parameter changes in the outputs of the inverter 4 are equal to or less than predetermined values, the heating output from the inverter 4 may be further reduced (the wattage thereof can be downed) to 100 W, for example. In the state where the heating output from the inverter 4 has been reduced as described above, if the detected capacitances do not have leaped values larger than that of a minimum capacitance signal (Vc(min)) by amounts equal to or more than a predetermined value (15 digits, for example), the heating operation may be stopped, since it is deemed that there is a higher possibility that boiling over has occurred. This is because it is deemed that no boiling over has occurred when the detected capacitances have values having been leaped from that of a minimum capacitance signal.

Also, detection of leaps of the capacitance signals may be directly utilized in the boiling-over detecting portion 11 and the control portion 8. For example, the boiling-over detecting portion 11 and the control portion 8 can be structured, such that if the newest capacitance signal (Vc(n)) is detected as having been leaped by an amount exceeding a predetermined value (15 digits, for example) as a result of a comparison of the detected newest capacitance signal (Vc(n)) with a minimum capacitance signal (Vc(min)) detected within a boiling-over determination time period (a reference-value updating stopping time period), they determine that no boiling-over state has occurred and restore reference-value updating processing operations. This is because the capacitance signals can not abruptly leap in boiling-over states, as described above.

Also, the boiling-over detecting portion 11 and the control portion 8 may be structured, such that they stop induction heating operations, if the gradient of the transition of the capacitance indicated by the detection signal from at least one of the electrodes (9a to 9g) comes to be equal to or more than a predetermined value, within a boiling-over determination time period (a reference-value updating stopping time period) which starts at the time the difference (the amount of change) between the reference value and the detected capacitance signal (Vc) has exceeded the first amount of change ($\Delta V1$). Further, the boiling-over detecting portion 11 and the control portion 8 may be structured, such that, at this time, they decrease the heating output to a third set value (0.1 kW, for example) which is smaller than the second set value. Also, they may be structured to immediately stop induction heating operations, if other electrodes also exhibit similar capacitance transitions.

Within the boiling-over determination time period, it is also possible to employ, as information for making determinations for boiling-over detection, the relativity among the capacitance signals from the three electrodes 9 (the left rear electrode 9a, the left front electrode 9b and the left center electrode 9c) or (the right rear electrode 9d, the right front electrode 9e and the right center electrode 9f) for detecting the capacitances regarding the single heating container 1. For example, if the capacitance signals from the three electrodes 9 exhibit different transitions (temporal changes), there is a possibility that slight boiling over has occurred. If they exhibit a same transition, there is a possibility that severe boiling over has occurred. Based on these facts, it is possible to make a determination as to whether or not to immediately stop the heating output.

During induction heating operations with the induction heating cooking device according to the present embodiment, if the user makes a change to the output (a change to the heating power) through the manipulation portion 18, the boiling-over detection operation is reset, and a new boiling-over detection operation is started. However, in an initial stage of the newly-set induction heating operation, a certain time period within which no boiling-over detection operation is performed is set to be shorter (3 seconds, for example). The certain time period within which no boiling-over detection operation is performed, in the initial stage, can be properly set according to the situations (the output, the temperature and the like).

In the induction heating cooking device according to the present embodiment, the boiling-over detecting portion 11 detects the capacitance of each of the electrodes 9 a plurality of times within a detection time period (a first predetermined time period: 1 second, for example), further calculates the average value of the plurality of the detected capacitances, and makes a comparison between the average value of the capacitances and the reference value (Vo). In this case, out of the plurality of capacitances detected within the detection time period (1 second, for example), the last-detected capacitance may be defined as the capacitance within this detection time period and may be compared with the reference value (Vo). With this structure, even if the capacitances detected within a detection time period are largely changed, the last and newest capacitance is compared with the reference value (Vo), which can improve the accuracy of the state detection.

Further, in the induction heating cooking device according to the present embodiment, within a detection time period (a first predetermined time period: 1 second, for example), if the plurality of capacitances detected a plurality of times have been changed from the reference value (Vo) by an amount equal to or more than a reference-value updating stopping threshold value (3 digits), the boiling-over detecting portion 11 can stop updating of the reference value (Vo) in the storage portion 12, further can reset the detection time period at this time, and can start determinations within a new detection time period and can execute reference-value updating processing for the storage portion 12.

1.3. Procedure for Making Settings for Boiling-Over Detection Operations.

1.3.1 Menu Display

FIGS. 4A to 4E illustrate states of menu display in the display portion 20 and the manipulation portion 18 in the induction heating cooking device according to the first embodiment, and illustrate procedure for making settings for boiling-over detection operations.

Figure 4A:
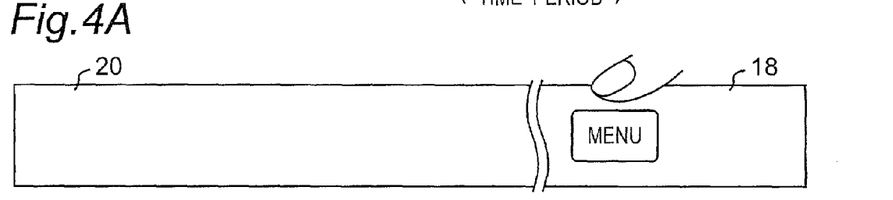
FIG. 4A is a view of a state of display on a manipulation portion and a display portion in the induction heating cooking device according to the first embodiment, illustrating procedure of making settings for boiling-over detection operations.
Figure 4B:
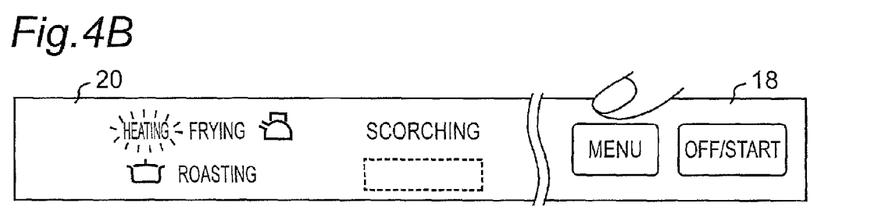
FIG. 4B is a view of a state of display on a manipulation portion and a display portion in the induction heating cooking device according to the first embodiment, illustrating procedure of making settings for boiling-over detection operations.

FIG. 4A is a view of a state of display on the manipulation portion 18 and the display portion 20, when the user makes settings of heating conditions, before induction heating operations of the induction heating cooking device according to the first embodiment. As illustrated in FIG. 4A, only a "Menu" manipulation switch is displayed, in a menu display portion in the manipulation portion 18. If the user selects (depresses) a "Menu" mark, this causes a "OFF/Start" mark to be displayed on the manipulation portion 18, in addition to "Menu" and, further, causes "Heating", "Pan mark", "Frying", "Roasting", "Pot mark" and "Scorching" mark to be displayed on the display portion 20, as illustrated in FIG. 4B. At this time, only "Heating" mark is displayed in a flashing manner.

In the state illustrated in FIG. 4B, if the "OFF/Start" mark is selected (depressed), this starts an induction heating operation, and starts a scorching detection operation. The scorching detection operation is for detecting scorching of the content in the heating container 1, wherein the detection is performed based on information about abrupt temperature rises in the temperature detecting portion 17. During the induction heating operation, only the scorching detection operation is exerted, while no boiling-over detection operation is started.

Figure 4C:
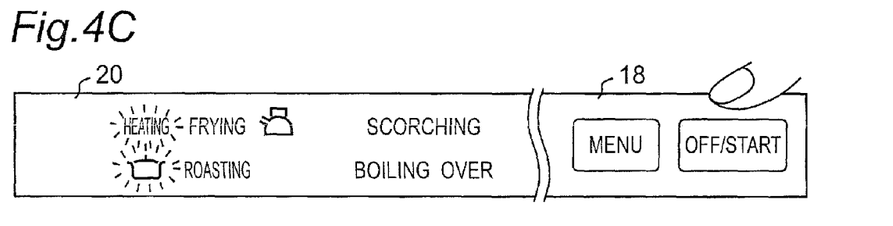
FIG. 4C is a view of a state of display on a manipulation portion and a display portion in the induction heating cooking device according to the first embodiment, illustrating procedure of making settings for boiling-over detection operations.
Figure 4D:
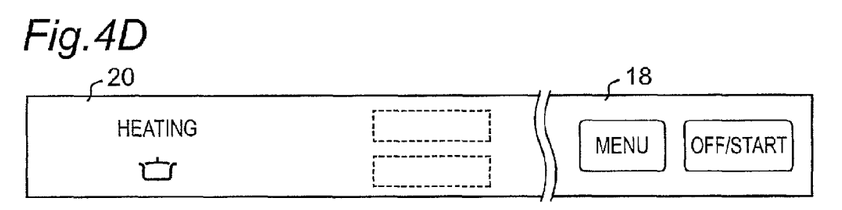
FIG. 4D is a view of a state of display on a manipulation portion and a display portion in the induction heating cooking device according to the first embodiment, illustrating procedure of making settings for boiling-over detection operations.

In the state illustrated in FIG. 4B, if the "Menu" mark is selected (depressed), a menu display portion in the display portion 20 is displayed, as illustrated in FIG. 4C. As illustrated in FIG. 4C, a "Boiling Over" mark is newly displayed in the menu display portion in the display portion 20 illustrated in FIG. 4B and, also, "Heating" and "Pan Mark" are displayed in a flashing manner in the menu display portion in the display portion 20. Namely, there is indicated that, in this state, if the user selects (depresses) the "OFF/Start" mark, this starts an induction heating operation and also starts a scorching detection operation and a boiling-over detection operation. FIG. 4D illustrates a state of display on the manipulation portion 18 and the display portion 20, during induction heating operations. As illustrated in FIG. 4D, during induction heating operations, "Heating", "Pan Mark", "Menu" and "OFF/Start" are displayed, which enables the user to change the menu or to stop induction heating operations, any time, during the induction heating operations.

Figure 4E:
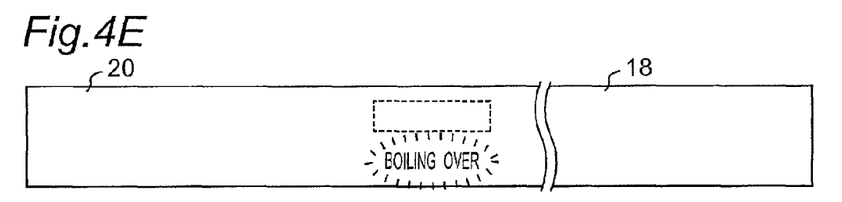
FIG. 4E is a view of a state of display on a manipulation portion and a display portion in the induction heating cooking device according to the first embodiment, illustrating procedure of making settings for boiling-over detection operations.

As described above, during induction heating operations for which a boiling-over detection operation is being set, if a boiling-over determination is confirmed and the occurrence of boiling over is detected, as a result of the boiling-over detection operation, "Boiling Over" is displayed in a flashing manner, in the menu display portion in the display portion 20, as illustrated in FIG. 4E. Further, the induction heating cooking device according to the first embodiment is structured to display, in a flashing manner, "Boiling Over" in the menu display portion in the display portion 20, on detecting boiling over. However, the induction heating cooking device can be also structured to make a notification of boiling-over states through sounds, in addition to displaying "Boiling Over" in a flashing manner.

Further, in the induction heating cooking device according to the first embodiment, the menu display portion in the display portion 20 is structured such that "Heating", "Frying", "Roasting", "Pot mark" and "Heating" are flashed in order, for making selections of objects to be heated, every time the "Menu" mark has been depressed and selected. Further, the "Pot Mark" indicates water boiling operations.

Further, in the induction heating cooking device according to the first embodiment, the manipulation portion 18 is provided with manipulation switches required for the induction heating cooking device, such as for selecting the heating heaters, temperature settings (heating output adjustments), timer settings (for example, arrow marks indicating leftward and rightward movements, marks indicating increases and decreases (+ and −), and the like).

Further, the manipulation portion 18 is usually provided near the manipulation electrodes 16 illustrated in FIG. 2. In order to ensure excellent safety of the induction heating cooking device, it is desirable that, around the manipulation portion 18 and the manipulation electrodes 16, smaller amounts of boiling over can occur at smaller frequencies, than around the other electrodes. Accordingly, for the electrodes 9b and 9e near the manipulation portion 18, in taking account of the fact that they have lower impedances, the third amount of change ($\Delta V3$) as the output stopping threshold value can be set to be larger.

1.4 Conclusions

As described above, the induction heating cooking device according to the first embodiment is structured to reduce (to down the wattages of) the heating output when there is a possibility that boiling over has occurred within a boiling-over determination time period. Further, the induction heating cooking device according to the first embodiment is structured to stop induction heating operations, when detection of the occurrence of boiling over has been confirmed. This state is illustrated in (a) and (b) of FIG. 3. As illustrated in (a) and (b) of FIG. 3, if the capacitance signal (Vc) has been changed from the reference value (Vo) by an amount equal to or more than the first amount of change (the reference-value updating stopping threshold value: $\Delta V1$), the reference-value updating time period ends, and a reference-value updating stopping time period is entered. Within the reference-value updating stopping time period, a capacitance signal (a capacitance voltage at the point A in (a) of FIG. 3) detected just before the entrance into the reference-value updating stopping time period is used as the reference value (Vo). Through the reference-value updating stopping processing, if the amount of change of the detected capacitance signal (Vc) from the reference value (Vo) exceeds the second amount of change (the output reduction threshold value: $\Delta V2$), the heating output from the inverter 4 is largely reduced. During the boiling-over detection time period thereafter, if the boiling-over occurrence conditions relating to the respective electrodes, which have been set based on the condition of the placement of the electrodes for boiling-over detection, are satisfied, boiling-over detection is confirmed, and the heating output is stopped.

The induction heating cooking device having the structure as described according to the present embodiment is capable of largely reducing false detections of boiling over from the heating container, which may be induced during induction heating operations, and is capable of certainly detecting the occurrence of boiling over, by accurately detecting the differences among the amounts of capacitance changes induced in the electrodes, based on signals from the plurality of the arc-shaped electrodes provided on the back surface of the top board, around the peripheries of the heating coils. Accordingly, the induction heating cooking device according to the present embodiment can form an induction heating cooking device with excellent reliability and safety.

INDUSTRIAL APPLICABILITY

It is possible to provide, on the market, induction heating cooking devices with excellent reliability which are capable of largely reducing false detections of boiling over from heating containers, which may be induced during induction heating operations.

The invention claimed is:

1. An induction heating cooking device comprising:
a top board on which a heating container is placed;
a heating coil, which is provided under the top board and is adapted to inductively heat the heating container;
an inverter for supplying a high-frequency electric current to the heating coil;
a plurality of electrodes provided on a back surface of the top board, around a periphery of the heating coil;
a capacitance detection portion adapted to supply a high-frequency signal to the electrodes and to detect a capacitance in each of the electrodes;
a storage portion capable of storing the detected capacitance as a reference value;
a control portion adapted to perform control such that a heating output from the inverter comes to have a first set value set at start of induction heating; and
a boiling-over detection portion that includes a plurality of storage areas that store initial capacitances associated with each of the plurality electrodes, wherein the boiling-over detection portion determines, for each electrode, whether respective differences between the initial capacitance stored in the storage areas that are associated with the plurality of electrodes and a reference value have changed by a first amount of change associated with a given electrode, wherein when the capacitance has changed by the first amount of change associated with the electrode, a boiling-over state is determined, wherein the first amount of change corresponds to a threshold capacitance value and the threshold capacitance value at which a boiling-over state is determined is different for each of the plurality of electrodes;
wherein the boiling-over detection portion is adapted to stop a heating operation of the inverter or to reduce the heating output from the inverter to a second set value smaller than the first set value, upon detecting a boiling-over state,
wherein the electrodes are provided in a linear shape, along the heating coil around an outer periphery of the heating coil.

2. The induction heating cooking device according to claim 1, wherein the boiling-over detection portion is adapted to:

execute reference-value updating processing for storing a newest capacitance as a reference value in the storing portion, when the capacitance detected by the capacitance detection portion has been changed from the reference value by an amount less than a second amount of change; and
stop the reference-value updating processing, when the capacitance detected by the capacitance detection portion has been changed from the reference value by an amount equal to or more than the second amount of change.

3. The induction heating cooking device according to claim 2, wherein the boiling-over detection portion is further adapted to reduce the heating output from the inverter to a third set value smaller than the first set value, when the capacitance detected by the capacitance detection portion has been changed from the reference value by an amount equal to or more than a third amount of change which is larger than the second amount of change but is smaller than the first amount of change.

4. The induction heating cooking device according to claim 1, further comprising a manipulation portion provided on the top board, wherein, for any of the electrodes near the manipulation portion, the first amount of change is set to be larger than those for the other electrodes.

5. The induction heating cooking device according to claim 1, wherein the boiling-over detection portion is adapted to change the first amount of change, such that the first amount of change comes to be larger with increasing set output of the heating coil.

6. A method for heating an item comprising:
providing an induction heating cooking device that includes:
a top board on which a heating container is placed;
a heating coil, which is provided under the top board and which is configured to inductively heat the heating container;
an inverter for supplying a high-frequency electric current to the heating coil;
a plurality of electrodes provided on a back surface of the top board, around a periphery of the heating coil, wherein the electrodes are provided in a linear shape, along the heating coil around an outer periphery of the heating coil;
a capacitance detection portion adapted to supply a high-frequency signal to the electrodes and to detect a capacitance in each of the electrodes;
a storage portion capable of storing the detected capacitance as a reference value;
a control portion adapted to perform control such that a heating output from the inverter comes to have a first set value set at start of induction heating; and
a boiling-over detection portion
for each electrode determining, by the boiling-over detection portion, whether a difference between a capacitance of the electrode and a reference value has changed by a first amount of change associated with the electrode;
determining that a boiling-over state has occurred when the capacitance has changed by the first amount of change associated with the electrode, wherein the first amount of change corresponds to a threshold capacitance value and the threshold capacitance value at which a boiling-over state is determined is different for each of the plurality of electrodes; and
discontinuing, by the boiling-over detection portion, a heating operation of the inverter or reducing the heating output from the inverter to a second set value smaller than the first set value, upon determining that a boiling-over state has occurred.

7. The method according to claim 6, further comprising:
executing, by the boiling-over detection portion, a reference-value updating process for storing a newest capacitance as a reference value in the storing portion, when the capacitance detected by the capacitance detection portion has changed from reference value by an amount less than a second amount of change; and
ceasing the reference-value updating processing when the capacitance detected by the capacitance detection portion has changed from the reference value by an amount equal to or more than the second amount of change.

8. The method according to claim 7, further comprising:
reducing, by the boiling-over detection portion, the heating output from the inverter to a third set value smaller than the first set value when the capacitance detected by the capacitance detection portion has been changed from the reference value by an amount equal to or more than a third amount of change which is larger than the second amount of change but is smaller than the first amount of change.

9. The method according to claim 6, wherein the induction heating cooking device further comprises a manipulation portion provided on the top board, wherein, for any of the electrodes near the manipulation portion, the first amount of change is set to be larger than those for the other electrodes.

10. The method according to claim 6, further comprising:
changing, by the boiling-over detection portion, the first amount of change such that the first amount of change increases with an increasing set output of the heating coil.

* * * * *